United States Patent
Yasuda et al.

(10) Patent No.: US 9,097,823 B2
(45) Date of Patent: Aug. 4, 2015

(54) LENS ARRAY, AND LENS ARRAY MANUFACTURING METHOD

(71) Applicant: FUJI XEROX CO., LTD., Tokyo (JP)

(72) Inventors: Shin Yasuda, Kanagawa (JP); Keishi Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 29 days.

(21) Appl. No.: 14/012,341

(22) Filed: Aug. 28, 2013

(65) Prior Publication Data

US 2014/0293428 A1    Oct. 2, 2014

(30) Foreign Application Priority Data

Mar. 26, 2013 (JP) ................. 2013-063252

(51) Int. Cl.
- *G02B 27/10* (2006.01)
- *G02B 3/00* (2006.01)
- *B29D 11/00* (2006.01)

(52) U.S. Cl.
CPC ........ *G02B 3/0012* (2013.01); *B29D 11/00298* (2013.01); *B29D 11/00375* (2013.01); *G02B 3/0056* (2013.01); *G02B 3/0075* (2013.01)

(58) Field of Classification Search
CPC .............. B29D 11/00009; B29D 11/00298; G02B 3/0012; G02B 3/0037
USPC .................................. 359/619–624
See application file for complete search history.

(56) References Cited

U.S. PATENT DOCUMENTS

| | | | |
|---|---|---|---|
| 8,514,505 B2* | 8/2013 | Chen | 359/819 |
| 2003/0081312 A1 | 5/2003 | Nemoto et al. | |
| 2004/0160675 A1 | 8/2004 | Nemoto et al. | |
| 2005/0128595 A1* | 6/2005 | Shimizu | 359/619 |
| 2010/0204064 A1* | 8/2010 | Cho | 506/17 |
| 2013/0308197 A1* | 11/2013 | Duparre | 359/621 |

FOREIGN PATENT DOCUMENTS

| | | |
|---|---|---|
| JP | A-64-88502 | 4/1989 |
| JP | A-2001-21703 | 1/2001 |
| JP | A-2003-202411 | 7/2003 |

* cited by examiner

*Primary Examiner* — Mahidere Sahle
(74) *Attorney, Agent, or Firm* — Oliff PLC

(57) ABSTRACT

Provided is a lens array including a plate-shaped light-absorbing material that is provided with plural holes separated from each other, and a lens formed of a polymer in each of the holes.

13 Claims, 4 Drawing Sheets

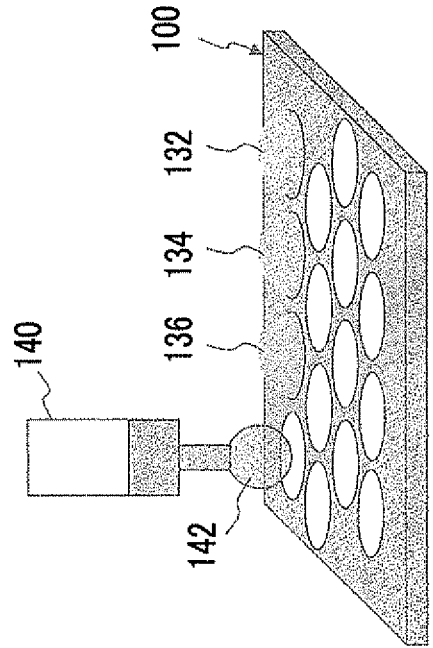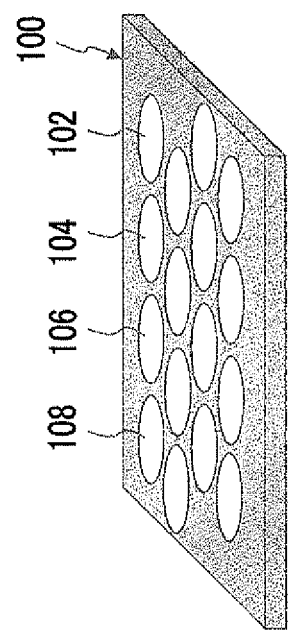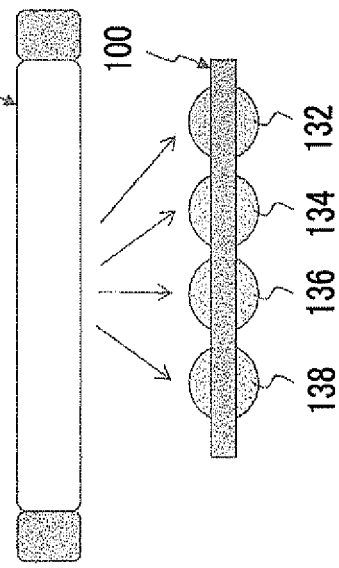

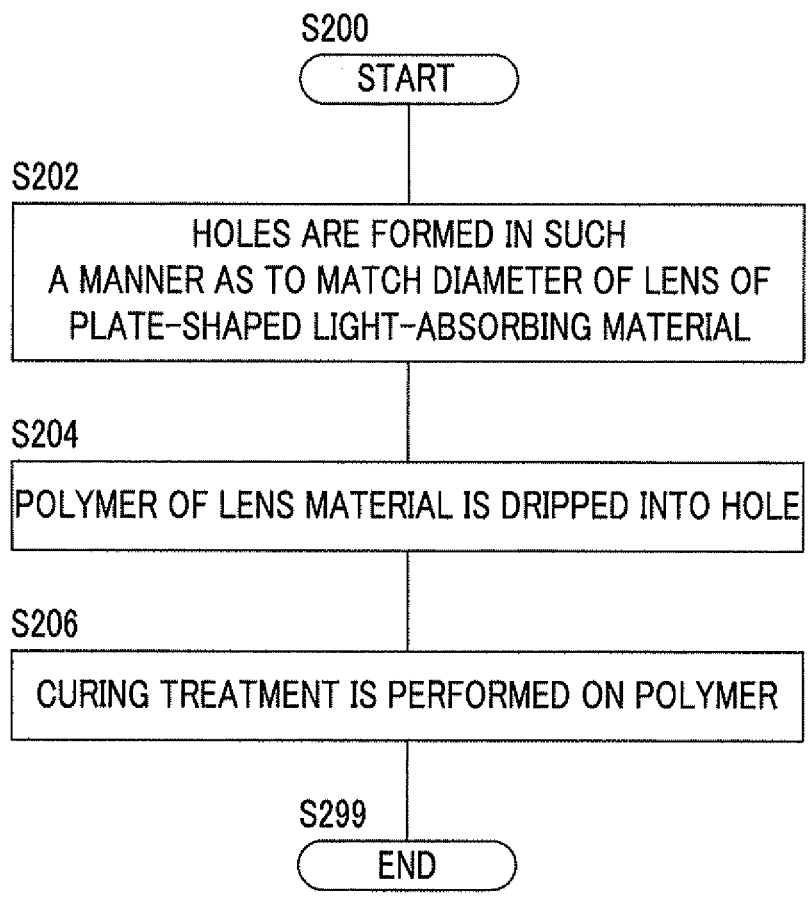
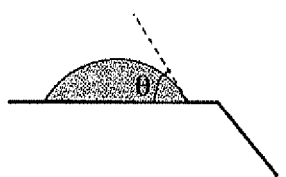 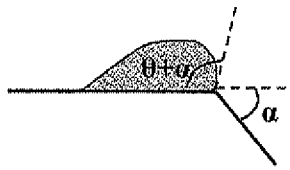
FIG. 3A    FIG. 3B

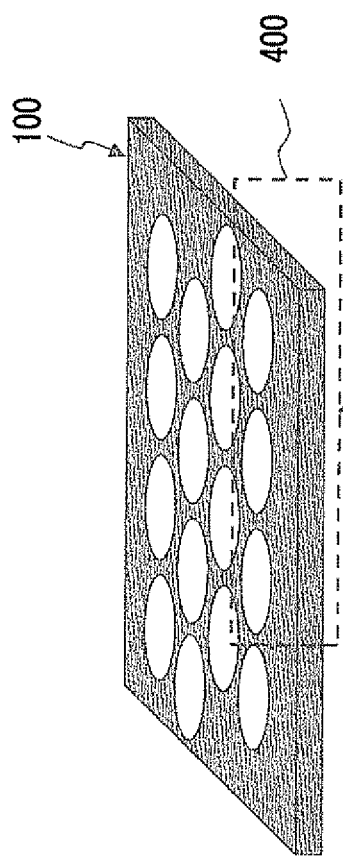
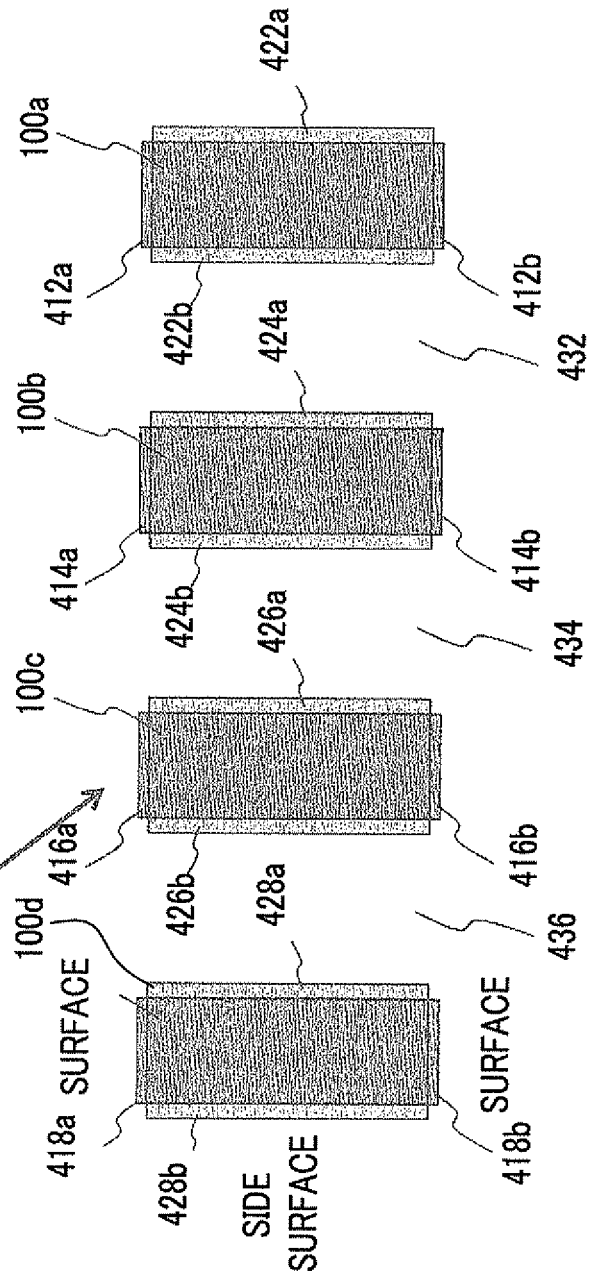

LENS ARRAY, AND LENS ARRAY MANUFACTURING METHOD

CROSS-REFERENCE TO RELATED APPLICATIONS

This application is based on and claims priority under 35 USC 119 from Japanese Patent Application No. 2013-063252 filed Mar. 26, 2013.

BACKGROUND

Technical Field

The present invention relates to a lens array, and a lens array manufacturing method.

SUMMARY

According to the invention, there is provided a lens array including: a plate-shaped light-absorbing material that is provided with plural holes separated from each other; and a lens formed of a polymer in each of the holes.

BRIEF DESCRIPTION OF THE DRAWINGS

Exemplary embodiments of the present invention will be described in detail based on the following figures, wherein:

FIGS. 1A to 1C are explanatory diagrams showing an example of a lens array manufacturing method;

FIG. 2 is a flowchart showing the example of the lens array manufacturing method;

FIGS. 3A and 3B are explanatory diagrams showing an example of curvature control;

FIGS. 4A and 4B are explanatory diagrams showing an example of a lens array manufacturing method.

DETAILED DESCRIPTION

Figure 5:
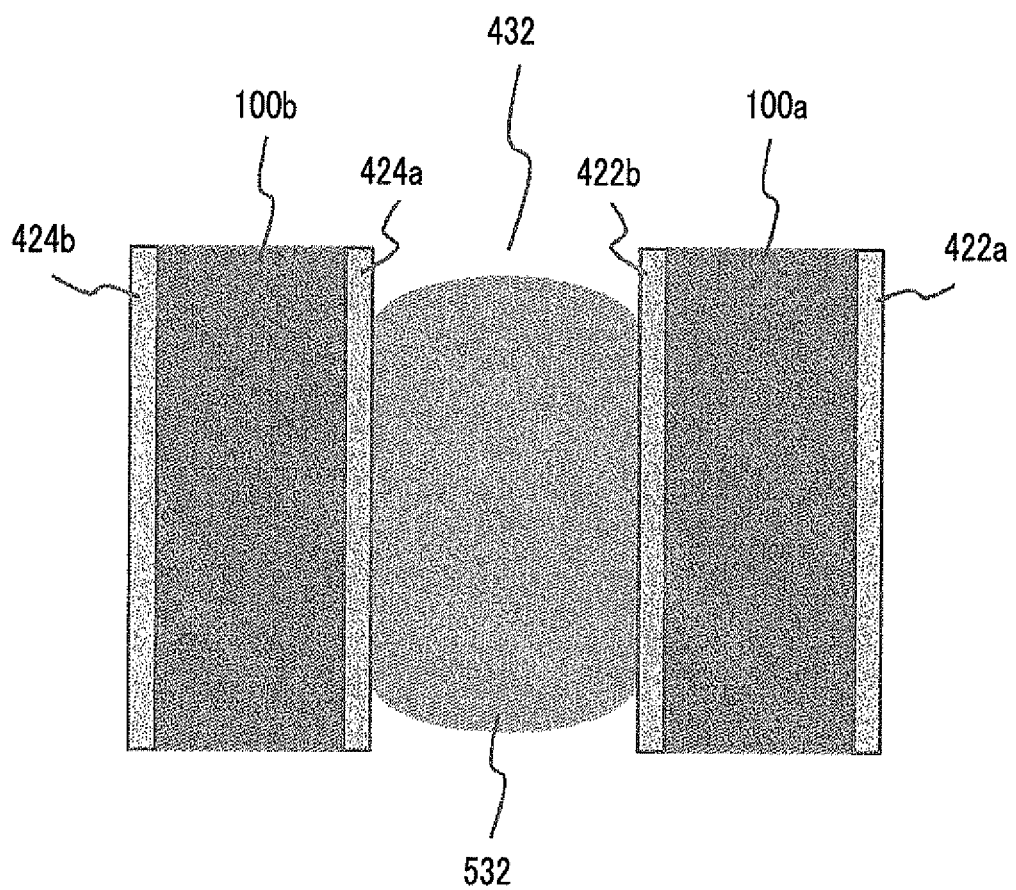
FIG. 5 is an explanatory diagram showing an example of a lens array manufacturing method.

Before description of exemplary embodiments, a technique that forms the basis thereof will be described. This description is to facilitate the understanding of the exemplary embodiments.

There has been proposed an upright imaging lens array for use in a copying machine, a fax machine, a scanner, a printer, a multifunction machine (image processing apparatus that has functions of at least two among a scanner, a printer, a copying machine, a fax machine and the like) and the like. In the lens array, light that is incident from adjacent lenses becomes noise (stray light) to deteriorate image quality.

As a method of inhibiting the stray light, there have been proposed a method of providing an aperture stop on a surface (a light-incident surface and a light-emitting surface) of a lens array and a method of providing a light-absorbing film on a groove or a ridge that is provided on a surface of a lens array.

Such light-shielding units shield only surfaces of lenses, and thus may not sufficiently inhibit the stray light that occurs when light propagating inside the lenses is incident upon adjacent lenses. This is because, in such lens arrays, the plural lenses are integrally molded, and thus the light that is incident from one of the lenses is emitted from an adjacent lens (stray light).

Hereinafter, various examples of exemplary embodiments suitable to implement the present invention will be described referring to the accompanying drawings.

First Exemplary Embodiment

FIGS. 1A to 1C are explanatory diagrams showing an example of a lens array manufacturing method. In a lens array according to the first exemplary embodiment, plural holes are formed separately from each other in a plate-shaped light-absorbing material in a staggered arrangement, and lenses in which a liquid polymer is cured are provided inside the holes.

As shown in the example of FIG. 1A, the holes (holes 102, 104, 106, 108, and the like) are bored in the plate-shaped light-absorbing material (plate 100) in such a manner as to match a diameter of the lens. The distance of the holes is what defines a lens pitch. For example, the plate 100 may be manufactured by punching a light-absorbing material plate with a mold, or may be manufactured by knitting fiber formed of a light-absorbing material into a mesh shape. The light-absorbing material may be any material that absorbs light, such as a metal carbide and a metal oxide. Also, the plate 100 itself may be formed of the light-absorbing material, or the light-absorbing material may be applied thereto. Also, the plate shape includes a sheet shape. Furthermore, it may use a fiber-reinforced plastics (FRP) plate or a polymer substrate in which carbon black is dispersed as the light-absorbing material. Preferably, the plate-shaped light-absorbing material has a thickness of from about 0.5 mm to about 5 mm. In the exemplary embodiment, a black ABS substrate (Shiraishi Kogyo Kaisha, Ltd.) having a thickness of about 2 mm is used.

Furthermore, the arrangement may be a staggered arrangement as shown in the example of FIG. 1A, a woven bamboo pattern arrangement or the like. Also, the hole may have a circular shape as shown in the example of FIG. 1A, or may have a shape of a regular polygon such as a square or a regular hexagon if the hole vertically penetrates the plate 100. In particular, from a perspective of image formation, it is preferable that the hole has the shape of the symmetrical regular polygon if the hole does not have the circular shape. Preferably, the diameter of the hole is from about 50 μm to about 1,000 μm. In the exemplary embodiment, a hole having a diameter of about 300 μm is used.

Next, as shown in the example of FIG. 1B, the liquid polymer (polymer 142) of the lens material is dripped into the holes (holes 102, 104, 106, 108, and the like) by using a polymer dripping device 140. The lens-shaped array (polymer 132, 134, 136, and the like) is formed by surface tension of the liquid polymer. The lenses have a convex shape. Herein, the liquid polymer may be a polymer cured through ultraviolet (UV) radiation, or a thermally fused polymer. The UV-cured polymer means a synthetic polymer that reacts to optical energy of ultraviolet rays and chemically changes from a liquid to a solid. It may use an acrylic polymer or an epoxy polymer as the UV-cured polymer. Specifically, examples of the acrylic polymer include NOA61 (viscosity: 300 cps) and NOA65 (viscosity: 1,200 cps) manufactured by NORLAND Products Inc., and examples of the epoxy polymer include 3553 (viscosity: 1,000 cps) manufactured by AZ Electronic Materials Manufacturing Co., Ltd. In the exemplary embodiment, NOA61 is used.

Also, curvature of the lens is adjusted by a pinning effect and the droplet amount. Herein, description will be made regarding pinning effect. FIGS. 3A and 3B are explanatory diagrams showing an example of curvature control (pinning effect caused by the edge of the bent surface). As shown in the example of FIG. 3A, a contact angle of a liquid interface of a liquid on a plate-shaped and flat surface is θ. As shown in the example of FIG. 3B, in a case where the liquid is present at a plate-shaped angle (angle α of an angle formed with a flat surface), the liquid may not be moved until the relation [contact angle>θ+α] is satisfied due to the pinning effect of the edge of the bent surface. Therefore, the aperture of each hole formed on the plate 100 functions as a edge portion for realizing the pinning effect so that the contact angle is an any angle between θ and θ+α, and therefore the curvature control may be performed by using the droplet amount (refer to, for example, "J. F. Oliver et al, J. Colloids and interface Sci, 59, 568 (1977)").

As shown in the example of FIG. 1C, a curing treatment is performed on the liquid polymer (polymer 132, 134, 136, and 138) that is dripped into the holes of the plate 100 through UV light radiation using a UV light source 150. In other words, the lens array is manufactured by curing the liquid polymer. Since the holes in which the lenses of the lens array are placed are separated from each other, the plate 100 functions as a light-shielding plate, and the stray light from the adjacent lenses is shielded. As a result, a light ray that is incident upon the adjacent lenses may be shielded, and thus the deterioration of the image quality caused by the stray light is inhibited.

As described above, in a case where the thermally fused polymer is used as the liquid polymer, the UV radiation is unnecessary, and the curing is performed by cooling.

FIG. 2 is a flowchart showing the example of the lens array manufacturing method.

In Step S202, the holes are formed in such a manner as to match the diameter of the lens of the plate-shaped light-absorbing material (refer to FIG. 1A).

In Step S204, the polymer of the lens material is dripped into the hole (refer to FIG. 1B).

In Step S206, the curing treatment is performed on the polymer (refer to FIG. 1C).

Second Exemplary Embodiment

FIGS. 4A, 4B, and 5 are explanatory diagrams showing examples of a lens array manufacturing method.

FIG. 4B shows an example of a cross section of an area 400 of a plate 100 shown in the example of FIG. 4A. Holes 432, 434, and 436 are configured of a partition wall 100a, a partition wall 100b, a partition wall 100c, and a partition wall 100d of the plate 100. A liquid-repellent treatment is performed on a surface of the plate 100 (liquid-repellent surfaces 412a, 412b, 414a, 414b, 416a, 416b, 418a, and 418b, herein, the surface includes a top surface and a back surface of the plate 100). Wet spreading of the droplet (liquid polymer) that is dripped into the holes to the surface may be inhibited by the liquid-repellent treatment. Also, the liquid-repellent treatment is performed on a side surface (liquid-repellent surfaces 422a, 422b, 424a, 424b, 426a, 426b, 428a, and 428b) of each of the holes. As shown in FIG. 5, the liquid-repellent treatment causes a polymer 532 that is a liquid to have a vertical convex shape (lens shape) on the side surface (liquid-repellent surfaces 422b and 424a) of the hole 432, and thus length of the lens may be adjusted by the liquid amount. In other words, it is possible to design a light-shielding effect.

Furthermore, the liquid-repellent treatment is performed on either one of the surface and the side surface, or both thereof. It is preferable to perform the liquid-repellent treatment on the surface and the side surface, or the liquid-repellent treatment may be the plate 100 that uses a liquid-repellent material (for example, fluorine polymer). Specifically, examples of the fluorine polymer for the liquid-repellent treatment include polytetrafluoroethylene, polyvinylidene fluoride, and a hexafluoropropylene tetrafluoroethylene copolymer. In the exemplary embodiment, polytetrafluoroethylene is used.

Also, in a case where the plate 100 in which the liquid-repellent treatment is performed on the surface and the side surface is used, each of the holes may be filled with the liquid polymer by dipping (dipping treatment) the plate 100 in the liquid (liquid polymer) that is the lens material, and the lens may be formed by curing the liquid polymer in each of the holes in the lens array manufacturing method.

A lens array includes a plate-shaped light-absorbing material that is provided with plural holes separated from each other; and a lens formed of a polymer in each of the holes.

A lens array manufacturing method includes forming plural holes separated from each other in a plate-shaped light-absorbing material; dripping a liquid polymer into each of the holes; and curing the liquid polymer in each of the holes.

A lens array manufacturing method includes forming plural holes separated from each other in a plate-shaped light-absorbing material; performing a liquid-repellent treatment on the plate-shaped light-absorbing material; filling each of the holes with a liquid polymer by dipping the plate-shaped light-absorbing material into the liquid polymer; and curing the liquid polymer in each of the holes.

The light-absorbing material may be a metal carbide or a metal oxide. The liquid-repellent treatment may be fluorine polymer coating. The plate-shaped light-absorbing material may have a surface subjected to a liquid-repellent treatment. The polymer may be a curable polymer. The polymer may be a thermoplastic polymer. The plural holes may be in a staggered arrangement. A side surface of each of the holes in the plate-shaped light-absorbing material may be subjected to a liquid-repellent treatment.

The exemplary embodiments described above are some of exemplary embodiments according to the present invention. The present invention is not limited thereto but various modifications may be implemented without departing from the scope and spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. (For example, the aperture of the hole may be of circular, rectangular or polygonal shape.) It is intended that the scope of the invention be defined by the following claims and their equivalents.

What is claimed is:

1. A lens array comprising:
   a plate-shaped light-absorbing material that is provided with a plurality of holes separated from each other; and
   a lens formed of a polymer in each of the holes,
   wherein the holes are provided in a staggered configuration, and
   wherein a side surface of each of the holes in the plate-shaped light-absorbing material is subjected to a liquid-repellent treatment, and
   wherein the polymer has a vertical convex shape on the side surface of each respective hole, thereby allowing for a curvature of the lens or a length of the lens to be adjusted by an amount of liquid.

2. The lens array according to claim 1,
   wherein the plate-shaped light-absorbing material has a surface subjected to a liquid-repellent treatment.

3. The lens array according to claim 1,
wherein the polymer is a curable polymer.

4. The lens array according to claim 2,
wherein the liquid-repellent treatment is fluorine polymer coating.

5. The lens array according to claim 1,
wherein the light-absorbing material is a metal carbide or a metal oxide.

6. The lens array according to claim 1,
wherein the polymer is a thermoplastic polymer.

7. The lens array according to claim 1,
wherein the plurality of holes are in a staggered arrangement.

8. A lens array manufacturing method comprising:
forming a plurality of holes separated from each other in a plate-shaped light-absorbing material, the plurality of holes being formed in a staggered configuration;
dripping a liquid polymer into each of the holes and subjecting a side surface of each of the holes in to a liquid-repellent treatment, wherein each liquid polymer has a vertical convex shape on a side surface of each respective hole;
curing the liquid polymer in each of the holes; and
adjusting a curvature or length of the lens based upon an amount of liquid.

9. The lens array manufacturing method according to claim 8,
wherein the light-absorbing material is a metal carbide or a metal oxide.

10. A lens array manufacturing method comprising:
forming a plurality of holes separated from each other in a plate-shaped light-absorbing material, the plurality of holes being formed in a staggered configuration;
performing a liquid-repellent treatment on a side surface of each of the holes in the plate-shaped light-absorbing material, wherein each liquid polymer has a vertical convex shape on a side surface of each respective hole;
filling each of the holes with a liquid polymer by dipping the plate-shaped light-absorbing material into the liquid polymer,
curing the liquid polymer in each of the holes; and
adjusting a curvature or length of the lens based upon an amount of liquid.

11. The lens array manufacturing method according to claim 10,
wherein the light-absorbing material is a metal carbide or a metal oxide.

12. The lens array manufacturing method according to claim 10,
wherein the liquid-repellent treatment is fluorine polymer coating.

13. The lens array according to claim 1,
wherein the light-absorbing material has a thickness of about 0.5 to about 5 mm.

\* \* \* \* \*